United States Patent
Faragher et al.

(10) Patent No.: US 12,438,594 B2
(45) Date of Patent: Oct. 7, 2025

(54) METHOD AND APPARATUS FOR IMPROVING CO-CHANNEL OPERATION OF INDEPENDENT RADIO SYSTEMS

(71) Applicant: Focal Point Positioning Limited, Cambridge (GB)

(72) Inventors: Ramsey Michael Faragher, Cambridge (GB); Robert Mark Crockett, Cambridge (GB); Peter James Duffett-Smith, Cambridge (GB)

(73) Assignee: FOCAL POINT POSITIONING LIMITED, Cambridge (GB)

( * ) Notice: Subject to any disclaimer, the term of this patent is extended or adjusted under 35 U.S.C. 154(b) by 324 days.

(21) Appl. No.: 18/198,591

(22) Filed: May 17, 2023

(65) Prior Publication Data
US 2023/0412245 A1    Dec. 21, 2023

Related U.S. Application Data

(60) Provisional application No. 63/343,382, filed on May 18, 2022.

(30) Foreign Application Priority Data

May 11, 2023    (WO) ................ PCT/GB2023/051243

(51) Int. Cl.
*H04B 7/08*    (2006.01)
*H04B 7/06*    (2006.01)

(52) U.S. Cl.
CPC ........... *H04B 7/086* (2013.01); *H04B 7/0617* (2013.01)

(58) Field of Classification Search
CPC .... H04B 7/086; H04B 7/0617; H04B 1/1027; H04B 7/06952; H04B 17/221;
(Continued)

(56) References Cited

U.S. PATENT DOCUMENTS 10,321,430 B2    6/2019    Faragher et al.
2001/0034208 A1*    10/2001    Kline .................... H04B 7/086
342/368

(Continued)

FOREIGN PATENT DOCUMENTS

EP    0 956 612 B1    8/2011

OTHER PUBLICATIONS

PCT International Search Report and Written Opinion for application No. PCT/GB2023/051243 dated Jul. 25, 2023, 22 pgs.
(Continued)

*Primary Examiner* — Don N Vo
(74) *Attorney, Agent, or Firm* — MOSER TABOA

(57) ABSTRACT

A method, apparatus and system for improving co-channel operation of simultaneously operating, independent radio signals. The method, apparatus and system receive at least two co-channel RF signals, perform motion compensated correlation upon at least one of the at least two co-channel RF signals, and determine the direction of arrival of the at least one of the at least two co-channel RF signals. In response to the direction of arrival determined for the at least one of the at least two co-channel RF signals, an action to perform to improve co-channel operation of the at least two co-channel RF signals at a subject receiver is determined.

20 Claims, 3 Drawing Sheets

(58) Field of Classification Search
CPC ...... G01S 7/006; G01S 13/882; G01S 7/0235; G01S 7/0236; G01S 7/2813; G01S 7/2886; G01S 13/426; G01S 7/0232
USPC ........................................................ 455/63.4
See application file for complete search history.

(56) References Cited

U.S. PATENT DOCUMENTS

| | | | |
|---|---|---|---|
| 2006/0057971 A1* | 3/2006 | Michida | H04B 7/10 455/24 |
| 2018/0210079 A1* | 7/2018 | Hammerschmidt | G01S 13/931 |
| 2021/0028829 A1* | 1/2021 | Rios | H04B 7/0697 |
| 2022/0095319 A1 | 3/2022 | Weimin et al. | |

OTHER PUBLICATIONS

Baylis et al., "Solving the 5G Crisis: Enabling Coexistence with Crucial Safety Systems through Adaptivity and Reconfigurability", 2022 IEEE Texas Symposium on Wireless and Microwave Circuits and Systems (WMCS), IEEE, Apr. 19, 2022, pp. 1-5, XP034178349, DOI: 10.1109/WMCS55582.2022.9866408 [retrieved on Aug. 30, 2022] abstract p. 2 section B; p. 3 section B.

* cited by examiner

METHOD AND APPARATUS FOR IMPROVING CO-CHANNEL OPERATION OF INDEPENDENT RADIO SYSTEMS

CROSS-REFERENCE TO RELATED APPLICATIONS

This application claims benefit of U.S. Provisional Patent Application Ser. No. 63/343,382 filed May 18, 2022 and PCT Patent Application Serial No. PCT/GB2023/051243 filed May 11, 2023, which are herein incorporated by reference in their entireties.

BACKGROUND

Field

Embodiments of the present principles generally relate to radio communications and, in particular, to a method, apparatus and system for providing co-channel operation of independent radio signals.

Description of the Related Art

Radio frequency bands are becoming more and more crowded with competing radio signals. The use of various modulation techniques, e.g., code division multiplexing (CDM), frequency division multiplexing (FDM), orthogonal frequency division multiplexing (OFDM), quadrature amplitude modulation (QAM), time division multiplexing (TDM), etc., or combinations thereof, has enabled transmitters and receivers to operate in the same band, i.e., co-channel operation. However, signals with a very low signal-to-noise ratio or signals that do not use sophisticated modulation schemes can be severely impacted by co-channel transmissions.

In one recent occurrence, 5G cellular signal transmitters were found to interfere with aircraft altimeters that operate in the same band. One of the frequency bands in which 5G systems operate is 3.7 to 3.98 GHz, while a particular aircraft altimeter that is used at an altitude of less than 2500 feet uses a frequency band of 4.2-4.4 GHz. This form of altimeter is used for low visibility approaches to an airport while the aircraft is using an autopilot system. The 5G operating band's proximity to the altimeter band resulted in erroneous altitude measurements. Interference with the accuracy of the aircraft altimeter may be detrimental to the operational safety of the aircraft.

Therefore, there is a need for a means for improving co-channel operation of radio signals in, for example, independent radio systems.

SUMMARY

Embodiments of the present principles provide methods, apparatuses and systems for improving co-channel operation of simultaneously existing, independent radio signals.

In some embodiments, a method, apparatus and system for improving co-channel operation of independent radio signals include correlating at least one local signal with at least one of at least one first RF signal from a first source or at least one second RF signal from a second source received at the antenna of the subject receiver to generate at least one correlation result, determining a motion of the antenna of the subject receiver, generating a plurality of phasors, where each phasor represents a hypothesis comprising a signal phase related to a relative direction of motion of the at least one of the at least one first RF signal or the at least one second RF signal with respect to the antenna, compensating a phase of at least one of the at least one local signal, the at least one of the at least one first RF signal or the at least one second RF signal or the at least one correlation result based on the generated plurality of phasors to determine at least one phase-compensated correlation result, identifying a phasor in the plurality of phasors that optimizes the at least one phase-compensated correlation result, determining a direction of arrival for the at least one of the at least one first RF signal or the at least one second RF signal using the identified phasor that optimizes the at least one phase-compensated correlation result, and determining, from the determined direction of arrival for the at least one of the at least one first RF signal or the least one second RF signal, an action to perform to improve co-channel operation of the at least one first RF signal and the at least one second RF signal at the subject receiver.

These and other features and advantages of the present disclosure can be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present principles can be understood in detail, a particular description of the present principles can be had by reference to embodiments, some of which are illustrated in the appended drawings. It is to be noted, however, that the appended drawings illustrate only typical embodiments of the present principles and are therefore not to be considered limiting of its scope, for the invention can admit to other equally effective embodiments.

DETAILED DESCRIPTION

Figure 1:
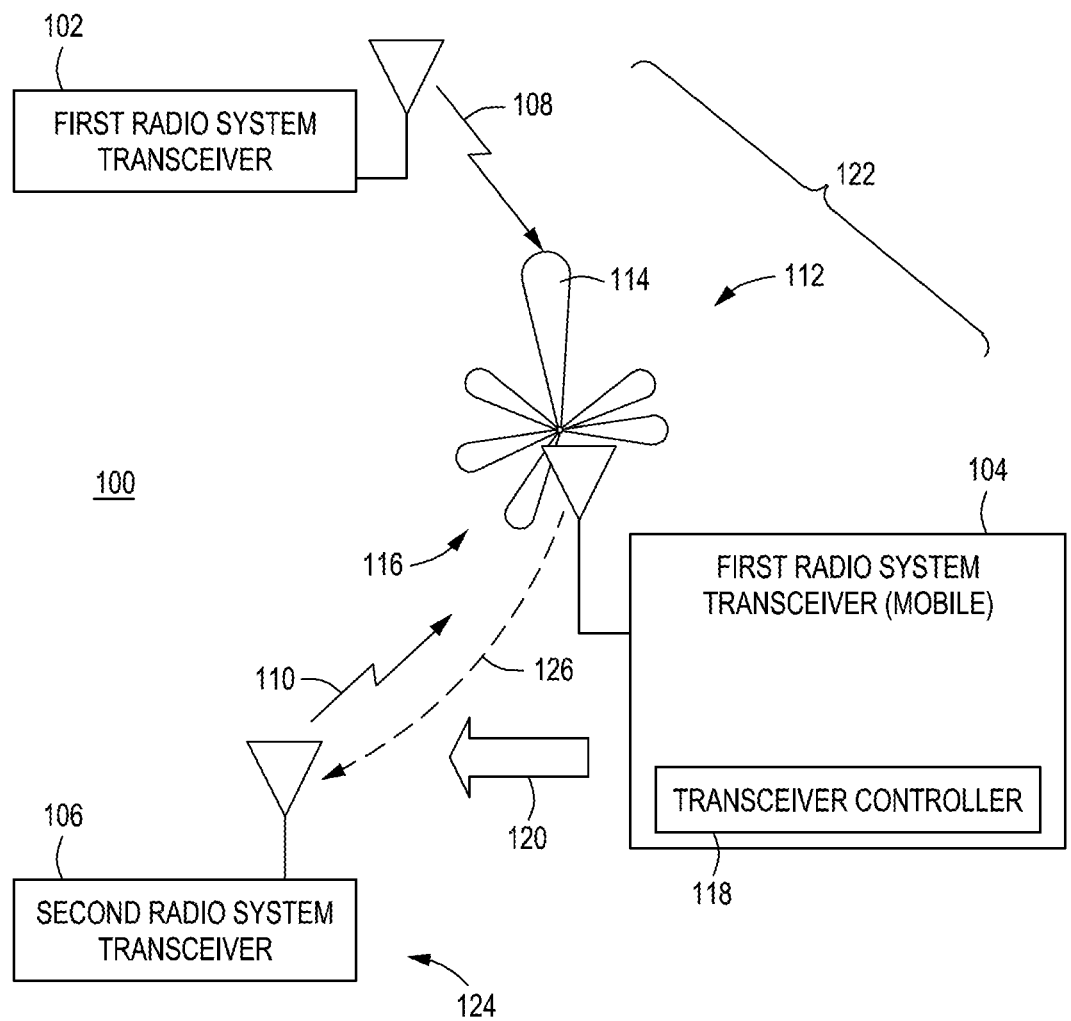
FIG. 1 depicts a block diagram of a communication environment in which an embodiment of the present principles can be applied in accordance with an embodiment of the present principles.

Embodiments of the present principles generally relate to methods, apparatuses and systems for improving co-channel operation of simultaneously existing, independent radio signals. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to specific radio signals originating from specific transmitters and being received by specific receivers, embodiments in accordance with the present principles can be applied to substantially any radio signals originating from substantially any transmitter and being received by substantially any receiver.

The phrase "subject receiver" is used herein and throughout the teachings of the present principles to refer to a receiver at which an improvement of co-channel functionality between independent radio signals having the same or substantially the same radio frequency is intended to be achieved in accordance with the present principles.

The terms "desirable/desired" and "undesirable/undesired" signals are used herein and throughout the teachings of the present principles to refer to signals that are intended to be received or not intended to be received, respectively, at a subject receiver at a specific moment in time in accordance with the present principles. The term "undesirable/undesired" as referring to a signal is not intended to convey that a signal is never to be received at a subject receiver but that a signal is not to be received at a same or similar point in time as another signal of a same or similar frequency.

Embodiments of the present principles provide methods, apparatuses and systems for improving co-channel operation of simultaneously-propagating, independent radio signals. In general, the methods, apparatuses and systems of the present principles receive at least one RF signal, perform motion compensated correlation upon the at least one signal, and determine the direction of arrival of the at least one signal. A response to the direction of arrival determined for the at least one RF signal is determined to improve co-channel operation of the at least one radio signal at, for example, a subject receiver.

Radio communications systems can utilize digital signals to improve communication throughput and security. Most of these systems utilize some form of deterministic digital code (e.g., Gold code) to facilitate signal acquisition. Such a digital code is deterministic by the receiver and broadcast by the transmitter to enable communications receivers to find, acquire and receive the transmitted signals. In accordance with the present principles, using such deterministic codes combined with accurate motion information for the receiver, embodiments of the present principles can identify the direction of arrival (DoA) of a signal propagation path between a receiver and transmitter. A specific technique for determining DoA of an RF signal using receiver motion information is known as SUPERCORRELATION™ and is described in commonly assigned U.S. Pat. No. 9,780,829, issued 3 Oct. 2017; U.S. Pat. No. 10,321,430, issued 11 Jun. 2019; U.S. Pat. No. 10,816,672, issued 27 Oct. 2020; US patent publication 2020/0264317, published 20 Aug. 2020; and US patent publication 2020/0319347, published 8 Oct. 2020, which are hereby incorporated herein by reference in their entireties. In at least some embodiments of the present principles, the SUPERCORRELATION™ technique is used to determine a DoA of an RF signal to improve co-channel performance of simultaneously received co-channel RF signals at, for example, a subject receiver in accordance with the present principles described herein.

In accordance with the present principles, upon determining the DoA of desired radio signals (i.e., radio signals intended to be received by a receiver) and/or undesired radio signals (i.e., radio signals not intended to be received by a receiver), a receiver of the present principles can implement a response/action to improve co-channel performance of independent radio signals. For example, in some embodiments, a receiver of the present principles can use the determined DoA of a radio signal to control reception direction of a receiver to perform one or more of: improve reception of signals from some transmitters (desired signals), degrade reception of signals from some transmitters (undesired signals), or send a control signal to a transmitter such that the transmitter may take/perform an action to change the functionality of equipment at the transmitter. In accordance with the present principles, a reception direction of a radio signal can be determined and controlled using, for example, the SUPERCORRELATION™ technique and beam steering of the antenna pattern of a receiver.

For example, if two radio systems are simultaneously operating in close proximity using the same or substantially similar channels (i.e., co-channel), a radio receiver or transceiver equipped with an embodiment of the present principles can control a receiver's antenna pattern to avoid receiving signals in the direction of a transmitter using a co-channel, which can interfere with reception of a desired radio signal at the receiver. Alternatively or in addition, in some embodiments, a radio receiver/transceiver implementing an embodiment of the present principles can control an antenna pattern of the receiver to improve reception of signals in the direction of a transmitter transmitting a desired radio signal. In other embodiments of the present principles, a first radio system can inform a transceiver in a second radio system to cease transmitting or receiving at a time when the second transceiver can experience interference from the first radio system or can cause interference in the first radio system, for example, the second radio system can be "blanked" at an appropriate time and for an appropriate duration of time.

In a more specific example, a first radio system can include a 5G cellular network having an antenna mast near an airport. A second radio system can include an altimeter radar on an aircraft that can provide altitude readings that can be interfered with when the 5G system is transmitting. That is, in some embodiments, a first RF signal can include a 5G signal and can have a difference in frequency of about 1 GHz or less from a second RF signal. For example, the first signal can have a frequency of about 3.7 to 3.98 GHz and the second signal can have a frequency of about 4.2 to 4.4 GHz.

In the aircraft example above, embodiments of the present principles can be collocated with the aircraft to determine a direction of arrival (DoA) of the 5G signals from nearby masts. Embodiments of the present principles can be implemented to control the altimeter antenna pattern to degrade signal reception in the direction of the 5G mast or can blank the altimeter operation while the 5G system is transmitting. In some embodiments, further improvement of the functionality of the altimeter can be accomplished by using an altimeter antenna pattern that is aimed toward the ground, perpendicular to the aircraft path of motion with a fan-like pattern. Such a pattern facilitates the use of a very short blanking period as the plane passes the 5G mast at high speed (e.g., 250 to 300 KPH). In further embodiments, a transceiver using an embodiment of the present principles can send a signal to the 5G transmitter and the transmitter can adjust its antenna pattern to avoid transmitting toward the aircraft.

In accordance with some embodiments of the present principles, transceivers and/or receivers can be manufactured to operate at lower transmission power such that overall component costs are lower and/or battery life is longer. Such improvements are useful in mobile devices that utilize communication techniques that use a deterministic code, for example, but not limited to, WiFi, Bluetooth, cellular telephone, and the like.

FIG. 1 depicts a block diagram of a communication environment 100 in which an embodiment of the present principles can be applied in accordance with an embodiment of the present principles. The communication environment 100 of FIG. 1 illustratively includes two independent radio systems 122 and 124. In the communication system 100 of FIG. 1, system 122 is represented by first radio system transceivers 102 and 104 and system 124 is represented by second radio system transceiver 106. In the embodiment of the communication environment 100 of FIG. 1, the first radio transceiver 102 (a remote source) is transmitting a desired signal 108 to the first/mobile radio signal transceiver 104, while the second radio system transceiver 106 (another remote source) transmits a signal 110 not desired by the mobile radio signal transceiver 104 within the communication environment 100. In the embodiment of FIG. 1, the radio signals 108 and 110 are transmitted in the same frequency band or a substantially similar frequency band (i.e., co-channel) such that, if both signals 108 and 110 were received by the mobile radio signal transceiver 104, the mobile radio signal transceiver 104 would not be able to receive the desired signal 108 in a best manner. In the embodiment of the communication environment 100 of FIG. 1, the first radio system transceiver 102 is illustratively a fixed base station that communicates to at least one mobile device, such as the mobile radio signal transceiver 104.

In the embodiment of the communication environment 100 of FIG. 1, the mobile radio signal transceiver 104 includes a transceiver controller 118 operating in accordance with embodiments of the present principles to respond to received signals to take/perform an action to improve the co-channel operation of the two independent radio systems 122 and 124 and in particular to improving the co-channel operation of the co-channel radio signals 108 and 110. Although in the embodiment of FIG. 1, the transceiver controller 118 is depicted as being an integrated component of the mobile radio signal transceiver 104, in alternate embodiments of the present principles, a transceiver controller of the present principles can comprise a component separate from the mobile radio signal transceiver 104 and in some embodiments can comprise a stand-alone component. In some embodiments of the present principles, a transceiver controller of the present principles, such as the transceiver controller 118 of FIG. 1, can comprise a computing device (described in greater detail below).

As described in detail below, in some embodiments of the present principles the transceiver controller 118 uses a SUPERCORRELATION™ technique as described in commonly assigned U.S. Pat. No. 9,780,829, issued 3 Oct. 2017; U.S. Pat. No. 10,321,430, issued 11 Jun. 2019; U.S. Pat. No. 10,816,672, issued 27 Oct. 2020; US patent publication 2020/0264317, published 20 Aug. 2020; and US patent publication 2020/0319347, published 8 Oct. 2020, which are hereby incorporated herein by reference in their entireties, to determine a direction of arrival (DoA) of one of the received signals 108, 110 or both. As the mobile radio signal transceiver 104 moves (represented by arrow 120) within the communication environment 100, the transceiver controller 118 computes motion information representative of the motion of the mobile radio signal transceiver 104. The motion information is used by the transceiver controller 118 to perform motion compensated correlation (described in greater detail below with respect to FIG. 3) on the received signals 108 and/or 110. From the determined motion compensated correlation information/process, the transceiver controller 118 estimates the DoA of at least one of the signals 108 and/or 110.

In the embodiment of the communication environment 100 of FIG. 1, having determined the DoA of at least one of the signals 108 and/or 110, the transceiver controller 118 can perform an action or cause an action to be performed to improve the co-channel operation amongst the systems 122 and 124. For example, in one embodiment of the present principles, the transceiver controller 118 can alter the antenna pattern 112 of the mobile radio signal transceiver 104 using, for example, beam steering. In some embodiment of the present principles, beam steering can be used to steer a main lobe 114 of the antenna pattern of the mobile radio signal transceiver 104 towards the DoA of the desired signal (signal 108) to enhance reception of the desired signal 108 (i.e., radio signal intended to be received by the receiver). Alternatively or in addition (i.e., a combination of both techniques), in some embodiments, beam steering can be used to steer or place an antenna pattern null 116 in the DoA of the undesired signal 110 (i.e., radio signal not intended to be received by the receiver) to suppress reception of the undesired signal 110.

For example, in embodiments, in which selecting one of a first signal and a second signal includes selecting the first signal, beam steering an antenna of a receiver in accordance with the present principles can include steering a main sensitivity lobe of the antenna towards the identified direction of arrival of the first signal. As such, the strength or gain of the received first signal can be increased because the antenna is re-oriented so that a most sensitive region or lobe of the antenna points towards the direction of arrival of the (desirable) first signal.

In embodiments, in which selecting one of a first signal and a second signal includes rejecting the second signal, beam steering the antenna of a receiver includes steering a sensitivity null of the antenna towards the identified direction of arrival of the second signal. As such, the strength or gain of the received second signal can be reduced because the antenna is oriented so that one of its least sensitive regions is aligned with the direction of arrival of the (undesirable) second signal. Such action indirectly improves the reception, or signal to noise ratio, of the first signal because the second signal is detected with a lower amplitude. Improving the signal to noise ratio can also be referred to as improving the gain or strength of the signal.

In embodiments in which a direction of arrival of both a first signal (desired signal) and the second signal (undesired signal) are both determined, beam steering or adjusting a radiation pattern of the antenna can be performed to align the second signal's direction of arrival with a sensitivity null of the antenna and the first signal's direction of arrival with a main lobe simultaneously. Such an action further reduces interference between the first and second signals.

In accordance with the present principles, a radiation pattern of an antenna of a receiver of interest can be steered or changed continuously to track a changing direction of arrival of a second remote source to account for movement between the antenna and the second remote source. In some embodiments, this can be achieved by continuously re-calculating the direction of arrival of the second signal. The re-calculation of the direction of arrival can be determined based on a previous calculation, for example based on an incremental change to the previous phasor in the plurality of phasors that produced an optimized phase-compensated correlation result (described in greater detail below). This makes use of the fact that any changing relative positioning of the antenna and the second remote source is likely to be gradual to re-calculate the direction of arrival more efficiently. Equally, the direction of arrival of the first signal can also be continuously calculated in the same way to repeatedly rotate or change the radiation pattern of the antenna.

In accordance with embodiments of the present principles, a SUPERCORRELATION™ technique can be used to enhance or suppress reception of signals based on their DoA. For example, in some embodiments, signal information determined using the SUPERCORRELATION™ technique can be used by the transceiver controller 118 to adjust receiver/antenna parameters such as frequency and frequency rate to enhance reception of desired signals arriving at the antenna of a transceiver from a particular direction or suppress reception of undesired signals arriving at the antenna from a different direction.

Alternatively or in addition, in some embodiments, a transceiver controller of the present principles, such as the transceiver controller 118 of FIG. 1, can cause a transceiver, such as the mobile radio signal transceiver 104 of FIG. 1, to blank the transceiver's operation during periods when a second radio system transceiver, such as the second radio system transceiver 106 of FIG. 1, is operating or when the mobile radio signal transceiver 104 is proximate to the second radio system transceiver 106.

In an exemplary scenario, a desired signal 108 can be a reflected altimeter signal transmitted by the mobile radio signal transceiver 104, which is located on an aircraft. In such scenarios, the transceiver controller 118 of the present principles can alter the antenna pattern to reduce a reception of an undesired signal (e.g., an interfering 5G signal), switch to a knife edge antenna pattern such that the period of interference is inconsequential to the mobile radio signal transceiver 104, and/or blank a reception ability of the mobile radio signal transceiver 104 during a period of possible interference.

In an alternative scenario in which the radio systems are not completely independent and with reference back to FIG. 1, a transceiver controller of a mobile transceiver of the present principles, such as the transceiver controller 118 of the mobile radio signal transceiver 104 of FIG. 1, can initiate a transmission of a control signal (represented by path 126 in FIG. 1) to the second radio system transceiver 106, as a response to the detection of an undesired signal 110. The control signal 126 can cause the transceiver 106 to alter its antenna pattern to steer a null in the direction of the mobile radio signal transceiver 104 or blank an operation of the transceiver 106 when proximate to the first/mobile radio signal transceiver 104. In general, in accordance with the present principles, in some embodiments the SUPERCORRELATION™ technique can be implemented by a transceiver controller of a first radio signal transceiver to determine a DoA of radio signals from a second radio signal transceiver and the transceiver controller of the first radio signal transceiver can use the information regarding the determined DoA to communicate signals to the second radio signal transceiver to affect the functionality of the second radio signal transceiver to improve the co-channel operation of independent radio signals.

Figure 2:
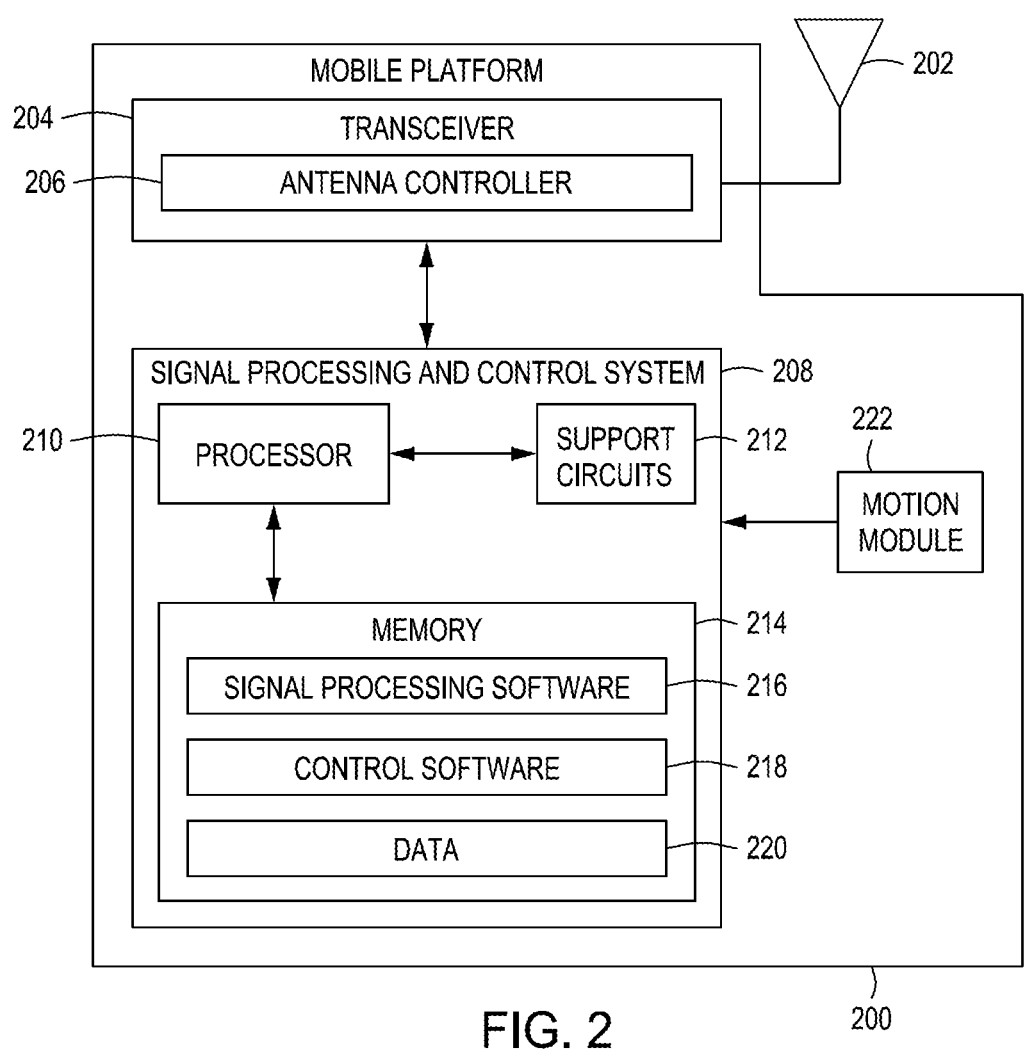
FIG. 2 depicts a block diagram of a radio signal system transceiver in accordance with an embodiment of the present principles, such as the first/mobile radio signal transceiver of FIG. 1.

FIG. 2 depicts a block diagram of a radio signal system transceiver in accordance with an embodiment of the present principles, such as the first/mobile radio signal transceiver 104 of FIG. 1. In the embodiment of FIG. 2, the first/mobile radio signal transceiver 104 illustratively comprises a mobile platform 200 and an antenna 202. The mobile radio signal transceiver 104 can be integrated into a mobile communication device including but not limited to a laptop computer or other computing device, a mobile phone, tablet computer, Internet of Things (IoT) device, unmanned flying vehicle, mobile computing system in an autonomous vehicle or human operated vehicle, and the like. In general, embodiments of the present principles can be applied in any environment where a mobile transceiver is used and in which a mobile transceiver can experience interference from another radio system operating in a co-channel manner.

In some embodiments of a mobile transceiver of the present principles, the mobile platform 200 and the antenna 202 are an indivisible unit (e.g., mobile phone) where the antenna 202 moves with the mobile platform 200. In such embodiments, the operation of the SUPERCORRELATION™ technique operates based upon the motion of the signal receiving antenna 202 As such, in some embodiments, a mention of motion or transceiver motion can refer to the motion of the antenna 202. In some embodiments, the antenna 202 can be separate from the mobile platform 200. In such embodiments, the motion estimate used in the motion compensated correlation process is the motion of the antenna 202. In most scenarios, the motion of the mobile platform 200 is the same as the motion of the antenna 202 and, as such, in most described embodiments, the motion of the platform 200 and the motion of the antenna 202 are the same.

In the embodiment of FIG. 2, the mobile platform 200 comprises a transceiver 204, a signal processing and control system 208 and a motion module 222. The transceiver 204 comprises an antenna controller 206 that facilitates antenna pattern control (i.e., antenna pattern beam steering). The antenna controller 206 can include a mechanical antenna steering mechanism or can include an electronic beam steering unit that drives a phased array antenna to alter the antenna pattern as is well-known to those skilled in the art.

The signal processing and control system 208 of FIG. 2 illustratively comprises at least one processor 210, support circuits 212 and a memory 214. The at least one processor 210 can include any form of processor or combination of processors including, but not limited to, central processing units, microprocessors, microcontrollers, field programmable gate arrays, graphics processing units, digital signal processors, and the like. The support circuits 212 of FIG. 2 illustratively comprise well-known circuits and devices facilitating functionality of the processor(s). The support circuits 212 can include one or more of, or a combination of, power supplies, clock circuits, analog to digital converters, communications circuits, cache, and/or the like.

In the radio signal system transceiver of FIG. 2, the memory 214 can comprise one or more forms of non-transitory computer readable media including one or more of, or any combination of, read-only memory or random-access memory. The memory 214 stores software and data including, for example, signal processing software 216, control software 218 and data 220. The signal processing software 216, when executed by the one or more processors 210, performs motion compensated correlation of the received signals to estimate the DoA of the received signals in accordance with the present principles. In one embodiment, the signal processing is only used on signals of interest, i.e., signals from the first radio system and signals from the second radio system, such that the processing focuses on specific signal sources to improve co-channel operation of the systems. In other embodiments, the signal processing of the present principles can be applied to all received signals to achieve improvement of signal reception at the first radio system transceiver in view of many simultaneously operating, co-channel systems. An embodiment of the motion compensated correlation and co-channel operation improvement process of the present principles is described in detail below with respect to FIG. 3. In the embodiment of FIG. 2, the operation of the signal processing software 216 and the control software 218 together function as the transceiver controller 118 of FIG. 1.

In accordance with the present principles, determined DoA information of received radio signals is used by the control software 218 to cause a response (i.e., adjust the antenna pattern, blank the transceiver, etc.) to the received signals to improve the co-channel operation of radio signals. In the embodiment of FIG. 2, data 220 stored in the memory 214 can also include signal estimates, correlation results, motion compensation information, motion information, position information and the like.

In the radio signal system transceiver of FIG. 2, the motion module 222 determines a motion estimate for the transceiver. In some embodiments, the motion module 222 can include an inertial navigation system (INS) as well as a global navigation satellite system (GNSS) such as GPS, GLONASS, GALILEO, DEIBOU, etc. The INS can comprise one or more of, but not limited to, a gyroscope, a magnetometer, an accelerometer, and the like, and may also include other devices such as an altimeter not usually associated with an INS system. To facilitate motion compensated correlation, the motion module 222 produces motion information (sometimes referred to as a motion model) comprising at least a velocity of the antenna 202 in the direction of the transmitter of interest (i.e., the direction of the desired signal or the undesired signal propagation path). The motion information can also comprise estimates of pitch, roll and yaw of the platform 200/antenna 202 as well as a heading (direction of travel) of the platform 200/antenna 202.

Figure 3:
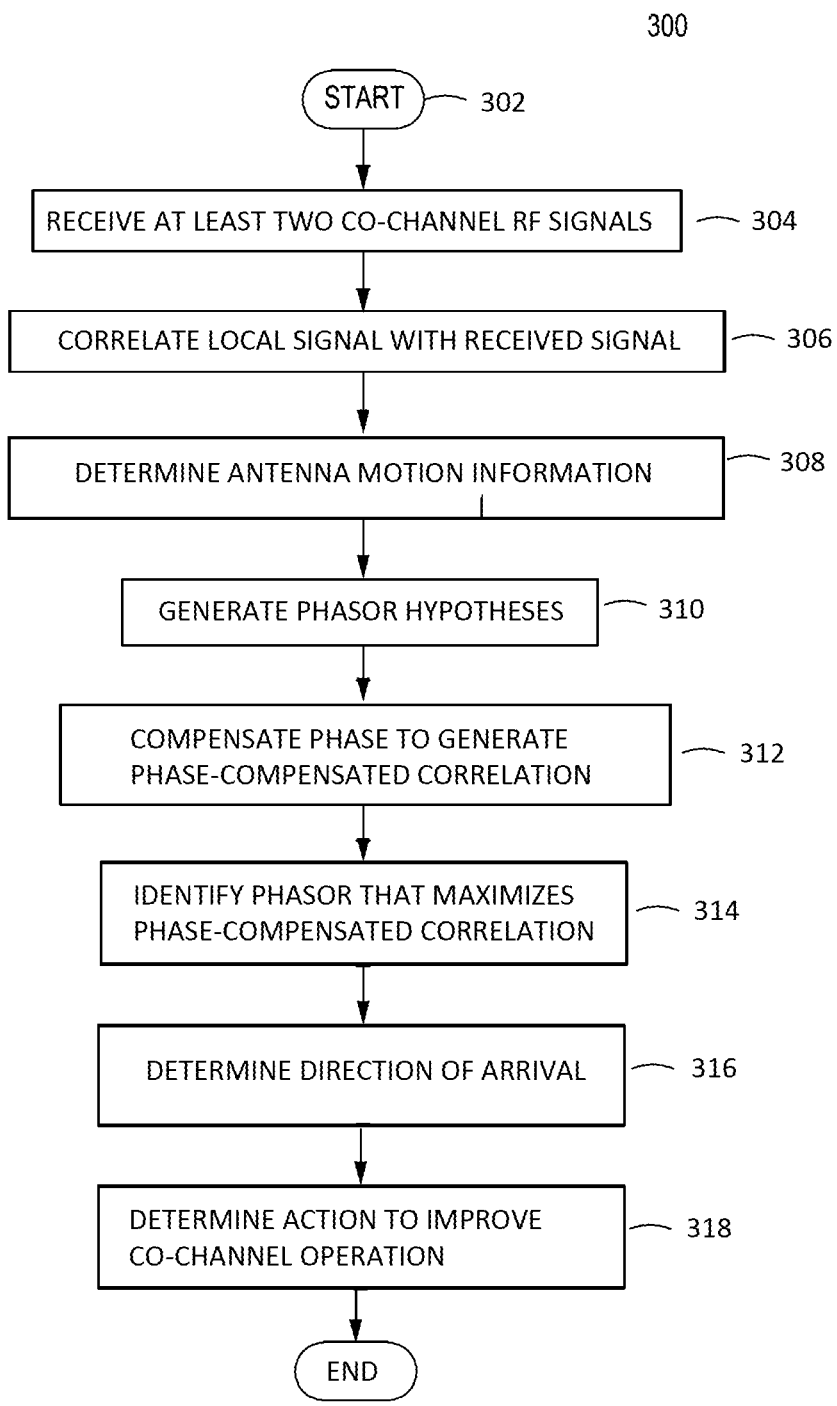
FIG. 3 is a flow diagram of a method of operation for the signal processing software of FIG. 2 in accordance with at least one embodiment of the present principles.

FIG. 3 depicts a flow diagram of a method 300 for improving co-channel operation of independent radio signals in accordance with an embodiment of the present principles. That is, FIG. 3 is a process of operation for the signal processing software 216 of the transceiver controller 118 of FIG. 1 and FIG. 2 in accordance with at least one embodiment of the present principles. The method 300 can be implemented in software, hardware or a combination of both (e.g., using the signal processing and control system 208 of FIG. 2).

The method 300 begins at 302 and proceeds to 304 during which at least two co-channel radio frequency (RF) signals are received at an antenna of a subject receiver (e.g., a first radio system transceiver 104) from at least two independent sources (e.g., first and second radio system transceivers), for example, in a manner as described above with respect to the embodiment of FIG. 1. In some embodiments, the received at least two co-channel RF signal include respective synchronization codes (e.g., Gold codes). The method 300 can proceed to 306.

At 306, at least one of the received at least two co-channel RF signals is correlated with at least one respective local signal at the subject receiver using the synchronization code, which is extracted from the at least one of the at least two co-channel RF signals received at the antenna of the subject receiver to generate at least one correlation result. The process of down-converting the at least one of the at least two co-channel RF signals, sampling the signal, and extracting the synchronization code is well known and as such will not be described in detail herein. In accordance with the present principles, at least one local code (at least one local signal) is correlated with at least one code extracted from the at least one of the at least two co-channel RF signals. In some embodiments, if a plurality of received signals are being processed, a plurality of local signals are generated. The method 300 can proceed to 308.

At 308, motion information of the antenna of the subject receiver is determined. In some embodiments, the motion information of the antenna of the subject receiver can be determined using, for example, a motion module of the present principles, such as the motion module 222 of FIG. 2. For example, in some embodiments, the motion information can include an estimate from the motion module 222 of the motion of the mobile radio signal transceiver 104 of FIG. 1. The method 300 can proceed to 310.

At 310, a plurality of phasors are generated, where each phasor represents a hypothesis related to a relative direction of motion of the received at least one of the at least two co-channel RF signals. More specifically, each phasor numerically represents a phase offset that a signal coming from a particular direction has due to the motion of the antenna of the subject receiver, as compared to an instance in which there is no relative motion between the antenna and a received RF signal. As such, each phasor represents and is referred to as a "hypothesis" of a direction of arrival for a respective one of the at least one of the at least two co-channel RF signals. That is, the signal phase in each phasor represents a direction of arrival for a respective radio signal. In some embodiments of the present principles, generating a plurality of phasors can include generating one set of phase hypotheses (or "phasors") related to antenna motion and one set of phase hypotheses (or "phasors") related to a direction of arrival for each received signal. Alternatively, in some embodiments, the two sets of hypotheses can be combined into a single set of respective hypotheses that can be tested substantially at or near simultaneously the same time to determine the direction of arrival for respective radio signals. The method 300 can proceed to 312.

At 312, a phase of at least one of the local signal, the received at least two co-channel RF signals or the at least one correlation result are compensated based on the set of generated phasors (i.e., hypotheses) to generate at least one phase-compensated correlation result. For example, in some embodiments, the phasor hypotheses can be used to adjust, at a sub-wavelength accuracy, the carrier phase of the local code with respect to the extracted code. In such embodiments, the adjustment or compensation can be performed by adjusting the phase of a local oscillator signal, the received signal, or the correlation result. More specifically, in some embodiments, for each received signal, the received RF signals can be correlated with the local signals using a set (plurality) of motion hypotheses containing estimates of a phase offset necessary to accurately correlate the received signals with the local signals. Once the motion compensated correlation is complete, the received signal can be correlated with local signals using phasors representing DoA hypotheses to determine the received signal direction of arrival. That is, each phasor represents a hypothesis comprising a signal phase representing a direction of arrival estimate for the at least one received RF signal. Each received signal can be correlated with that signal's set of hypotheses. The hypotheses are used as parameters to form the phase-compensation phasors to phase compensate the correlation process at a sub-wavelength accuracy. As such, the phase compensation can be applied to the received RF signals, the local frequency source (e.g., an oscillator), or the determined correlation values.

In some embodiments, the hypotheses collectively form an $N^V$ search space, where N is the number of hypotheses and V is the number of variables that need to be defined. In addition to searching over the direction of arrival space and the transceiver motion compensation space, hypotheses related to other parameters, such as oscillator frequency to correct frequency and/or phase drift, can be applied/determined. Other hypotheses can be directed to other parameters including heading to ensure the correct motion compensation is being applied. The result of the correlation process is a plurality of phase-compensated correlation results—one phase-compensated correlation value for each hypothesis for each received signal. As described above, in some embodiments, there is a set of hypotheses (including one set of phase hypotheses related to antenna motion and one set of phase hypotheses related to direction of arrival) for each received signal and in other embodiments, the two sets of hypotheses may be combined into a single set of hypotheses that are all tested simultaneously.

Alternatively or in addition, in some embodiments of the present principles, the motion estimates described above can include hypotheses of the motion in a direction of interest of transceivers that transmitted received RF signals. At initialization, the direction of interest can be unknown or inaccurately estimated. Consequently, a brute force search technique can be used to identify the directions of interest by searching over all directions and correlating signals received in all directions. A comparison of correlation results over all the directions enables a process of the present principles to narrow a search space in the direction of the transceivers of interest. Using an iterative process, the search space is narrowed and a DoA estimate is determined. In such embodiments, there is very strong correlation between the true values of these hypotheses between code repetition, such that the initial search might be intensive, but subsequent processing only requires tracking of the parameters in the system as time evolves. Consequently, subsequent compensation is performed over a narrower search space.

In some embodiments of the present principles, if a signal from a given transceiver was received previously, the set of hypotheses for newly received signals include a group of phasor hypotheses using the expected Doppler and Doppler rate and/or the last Doppler and Doppler rate used in receiving the prior signal from that transceiver. The values can be centered around the last values used or the last values used additionally offset by a prediction of further offset based on the expected mobile transceiver motion. The method 300 can proceed to 314.

At 314, a phasor (i.e., hypothesis) in the plurality of phasors (i.e., hypotheses) that optimizes the at least one motion-compensated correlation result is identified. That is, at 314, the motion-compensated correlation results are analyzed to find a "best" or optimal result for each received RF signal. In some embodiments, a joint correlation output is produced as a function (e.g., summation) of the plurality of motion-compensated correlation values resulting from all the hypotheses for a given received signal. The joint correlation output can be a single value or a plurality of values that represent the parameters that provide an optimal or best motion-compensated correlation output. In some embodiments, a cost function is applied to each set of resulting motion-compensated correlation values for each received RF signal to find the optimal correlation output that represents the most accurate set of variables used in the hypotheses. The method 300 can proceed to 316.

At 316, a direction of arrival (DoA) for at least one of the received at least two co-channel RF signals is determined using the identified phasor (i.e., hypothesis) that optimizes the at least one phase-compensated correlation result. That is, in some embodiments, a DoA of each received RF signal is determined from the optimal motion-compensated correlation result for each of the received RF signals. As such and in accordance with the present principles, motion-compensated correlation enables the determination of the DoA of received RF signals. The method 300 can proceed to 318.

At 318, an action to take/perform to improve co-channel operation of the received at least two co-channel RF signals at the subject receiver is determined from the direction of arrival determined for at least one of the at least two co-channel RF signals.

The method 300 can then end.

In other embodiments of the present principles, rather than using a largest magnitude correlation value, other test criteria can be used. For example, in some embodiments of the present principles, the progression of correlations can be monitored as hypotheses are tested and a cost function can be applied that identifies the best hypothesis or hypotheses when the cost function reaches a minimum (e.g., a small hamming distance amongst peaks in correlation plots). In such embodiments, a joint correlation output can include a joint correlation value or a group of values. In other embodiments, additional hypotheses can be tested in addition to direction hypotheses to, for example, ensure the motion compensation parameters (i.e., speed and heading) are correct.

In some embodiments of the present principles, the method 300 can further include performing the determined action to improve co-channel operation of the received, at least two co-channel RF signals at the subject receiver.

In accordance with the present principles, an action to be taken/performed to improve co-channel operation of the received at least two co-channel RF signals can include any of the actions described herein, including, but not limited to altering a pattern of transmission of at least one of the at least two co-channel RF signals, and/or altering a pattern of sensitivity of the antenna of the subject receiver to reception of at least one of the at least two co-channel RF signals, based on an identified DoA, to alter a reception sensitivity of the antenna of the subject receiver; beam steering the antenna of the subject receiver, including steering a main sensitivity lobe of the antenna towards a determined DoA of an RF signal desired to be received at the subject receiver and away from a DoA of an RF signal not desired to be received; communicating a signal to a source of at least one local RF signal or an independent source of at least one of the at least two co-channel RF signals to alter a quality of reception of at least one of the at least two co-channel RF signals at the antenna of the subject receiver; and communicating a signal to a source of at least one local RF signal or the independent source of a received at least one RF signal to alter a quality of transmission of the at least one local RF signal. In some embodiments of the present principles, altering a quality of reception can include altering a signal to noise ratio of the at least one local RF signal and/or a received at least one remote RF signal.

More specifically, in some embodiments in which at least one of received at least two co-channel RF signals comprises an RF signal from a first source intended to be received (desired) by the subject receiver, the determined action to perform can include at least one of adjusting an antenna pattern of the antenna of the subject receiver to increase a reception quality of the desired RF signal at the subject receiver, adjusting a time of reception of the antenna of the subject receiver to configure the antenna to receive signals during a time of transmission of the desired RF signal, or communicating a command to the first source to cause the first source to perform an action to increase a reception quality of the desired RF signal at the subject receiver. In such embodiments, a location of the first source can be determined using a determined DoA of the desired RF signal.

In some embodiments of the present principles, adjusting an antenna pattern of the antenna of the subject receiver to increase a reception quality of the desired RF signal at the subject receiver includes at least one of beam steering a main sensitivity lobe of an antenna pattern of the antenna toward a determined direction of arrival of the desired RF signal or the first source, or steering a null of the antenna pattern of the antenna away from the determined direction of arrival of the desired RF signal or the first source. In some embodiments of the present principles, communicating a command to the first source to cause the first source to take/perform an action to increase a reception quality of the desired RF signal at the subject receiver includes at least one of communicating a command to the first source of the desired RF signal to adjust an antenna pattern of a transmission antenna of the first source to steer a transmission of the desired RF signal from the first source toward the antenna of the subject receiver, or communicating a command to the first source of the desired RF signal to steer a null of the antenna pattern of the transmission antenna of the first source away from the direction of the antenna of the subject receiver.

In some embodiments of the present principles, in which at least one of the at least two co-channel RF signals comprises an RF signal from a second source local to the subject receiver but not intended to be received (undesired) by the subject receiver, a determined action to perform can include at least one of adjusting an antenna pattern of the antenna of the subject receiver to decrease a reception quality of the undesired RF signal at the subject receiver, adjusting a time of reception of the antenna of the subject receiver to prevent the antenna from receiving signals during a time of transmission of the undesired RF signal, or communicating a command to the second source to cause the second source to perform an action to decrease a reception quality of the undesired RF signal at the subject receiver. In some embodiments of the present principles, a location of the second source can be determined using a determined DoA of the undesired RF signal.

In some embodiments of the present principles, adjusting an antenna pattern of the antenna of the subject receiver includes at least one of beam steering a main sensitivity lobe of the antenna pattern of the antenna away from a determined direction of arrival of the undesired RF signal or the second source, or steering a null of the antenna pattern of the antenna in the determined direction of arrival of at least one of the undesired RF signal or the second source. In some embodiments of the present principles, communicating a command to the second source to cause the second source to perform an action to decrease a reception quality of undesired RF signal at the subject receiver includes at least one of communicating a command to the second source of the undesired RF signal to adjust an antenna pattern of a transmission antenna of the second source to steer a transmission of the undesired RF signal away from the antenna of the subject receiver, or communicating a command to the second source of the undesired RF signal to steer a null of the antenna pattern of the transmission antenna of the second source in the direction of the antenna of the subject receiver.

In some embodiments of the present principles there is provided a method for improving co-channel operation between a plurality of radio systems using a signal processing system including receiving, at a receiver of the signal processing system, a first signal from a first remote source and a second signal from a second remote source, wherein the first signal and the second signal have the same or similar frequencies causing the first signal to interfere with the reception of the second signal, selecting one of the first signal and the second signal, correlating at least one local signal with the selected signal to generate at least one correlation result, determining a motion of an antenna of the receiver, generating a plurality of phasors each phasor including a signal phase, where each phasor represents a direction of arrival estimate for the selected signal, compensating a phase of at least one of the at least one local signal, the selected signal or the at least one correlation result based on the plurality of phasors and a corresponding plurality of direction of arrival estimates to generate a plurality of phase-compensated correlation results, determining a phasor in the plurality of phasors that produces an optimized phase-compensated correlation result, identifying a direction of arrival for the selected signal using the determined phasor, determining, from the direction of arrival of the selected signal, one or more actions for improving the reception of the second signal at the receiver; and performing the one or more actions to improve co-channel channel operation between the plurality of radio systems.

Embodiments of the present principles reduce signal interference between a first signal (which can correspond to an undesirable signal) and a second signal (which can correspond to a signal intended for receipt by the signal processing system) at a receiver. The one or more actions of the present principles implement the determined direction of arrival to adjust a behavior of the plurality of radio systems, i.e. the first remote source, the second remote source, and/or the signal processing system, to improve the reception of a signal, for example the second signal, at the receiver. Such actions reduce interference of these radio systems operating in similar frequencies, or, in other words, improves co-channel operation of the radio systems.

The one or more actions of the present principles can include any suitable operation to minimize interference between co-channel independent RF signals. In one example, the action can include switching the first or second remote source to, or request that the first or second remote source switches to, a different frequency. The determined direction of arrival can be used to identify the first or second remote source to make such a request.

In embodiments of the present principles, the second remote source can be an original source of radiation (i.e., a transmitter external from the signal processing system). Alternatively, the second remote source can be a point of reflection of a signal emitted by a transmitter of the signal processing system. In one example, the signal processing system can be co-located with a radar system and the second signal corresponds to a reflected radar signal used to determine a distance to an object. The first signal can also be a direct line of sight signal or a reflected signal. However, in most instances, the first signal and the second signal originate from different transmitters.

In most instances, the first signal and the second signal have frequencies sufficiently similar for the receipt of the first signal to degrade the quality of the (simultaneous) reception of the second signal at the receiver. In one example, the first and second signals can be in adjacent frequency bands or within the same frequency band. In some embodiments, the first and second signals are radio signals and the first and second remote sources are radio sources.

In some embodiments, a respective direction of arrival can be determined for both, the above described first and second signals in the same manner, by correlating at least one local signal with a plurality of received RF signals to generate at least one correlation result, determining a motion of the antenna; generating a plurality of phasors each comprising a signal phase, where each phasor represents a direction of arrival estimate for the plurality of received RF signals, compensating a phase of at least one of the at least one local signal, the plurality of received RF signals or the at least one correlation result based on the plurality of phasors and a corresponding plurality of direction of arrival estimates to generate a plurality of phase-compensated correlation results, determining a phasor in the plurality of phasors that produces an optimized phase-compensated correlation result, and identifying a direction of arrival for the plurality of received RF signals using the determined phasor. In such embodiments, the one or more actions described herein can be determined and performed based on directions of arrival calculated for both the first signal and the second signal and/or any others of the plurality of received RF signals.

In such embodiments, the one or more actions can include altering a pattern of transmission of the first signal or the second signal, and/or altering a pattern of sensitivity of the antenna, based on the identified direction of arrival, to improve the reception of the second signal at the receiver. In this way, the gain or strength of the first signal can be reduced, or alternatively the gain of the second signal can be increased, by aligning regions of low or high sensitivity of the antenna with the direction of arrival of the first and/or second signals. Such actions minimize the detrimental interference effects of receiving the first signal and the second signal simultaneously.

In some embodiments, the pattern of transmission can be a spatial antenna pattern, also known as a "radiation pattern", of the first or second remote source that is changed to a different three-dimensional profile or rotated to a different orientation so that a main transmission lobe is pointed towards or away from the antenna of the signal processing system. In one specific example, the antenna pattern could be changed from a typical fan-like pattern to a "knife-edge" pattern more heavily weighted towards a particular direction. The pattern of transmission can also be a temporal pattern, wherein the transmission is inhibited or "blanked" temporarily to prevent interference between the first and second signals. In one example, the transmission of the first signal can be inhibited for a predetermined time period or while the antenna and the first remote source are within a threshold distance. Similarly, a sensitivity pattern of the antenna can be altered spatially by reorienting or changing its radiation pattern. Alternatively, the sensitivity pattern can be altered temporally, by temporarily disregarding (or "blanking") signals received by the antenna.

In some embodiments of the present principles, rotating or changing the radiation pattern of an antenna can be performed mechanically, by physically moving the antenna or digitally, for example using an electronic beam steering unit that drives a phased array antenna to alter the antenna pattern, as is known to those skilled in the art. Motion compensation can also be used to artificially alter or re-orient an antenna pattern. For example, motion compensation can be used to adjust receiver parameters such as frequency and frequency rate to enhance reception of desired signals arriving at the antenna from a particular direction or suppress reception of undesired signals arriving at the antenna from a different direction.

In accordance with the present principles, a determined direction of arrival can be used to identify a source of and RF signal, such as the first signal. For example, the first signal can be emitted by a 5G radio tower in a known location, in which case the determined direction of arrival of the first signal can be compared to the known location. An instruction to temporarily inhibit transmission of the first signal can be sent to the identified source using a signal generated by a transceiver controller of the present principles, such as the transceiver controller 118 of FIG. 1.

Alternatively or in addition, a determined direction of arrival in accordance with the present principles, can be used to determine that the source cannot be identified, in which case a sensitivity pattern of the antenna or the receiver can be altered to avoid interference.

In some embodiments and as described above, one or more actions taken/performed in accordance with the present principles to improve co-channel operation of independent RF signals can include communicating a command to a source of an RF signal to cause the source to take/perform an action that reduces a reception interference at a receiver of the RF signal to improve co-channel operation of independent RF signals at the receiver. The action taken/performed by the source of the RF signal can include any suitable measure to reduce interference at the receiver, for example switching to a different frequency and adjusting a transmission pattern of the RF signal, such as beam steering an antenna of the source away from the receiver or temporarily disabling transmission of the RF signal. In some embodiments, the command communicated to the source can inform the source of the angular position of the antenna of the receiver so that the source can steer a beam of its own antenna away from the antenna of the receiver. That is, in embodiments in which the RF signal is an undesired RF signal (i.e., an RF signal not intended to be received by the receiver), the receiver can send a command to a source of the undesired RF signal to cause the source of the undesired RF signal to take/perform an action to reduce a reception quality of the RF signal at the receiver. In such embodiments, such action improves co-channel operation of independent RF signals at the receiver.

In other embodiments of the present principles, a method is provided for improving co-channel operation between a plurality of radio systems using a signal processing system. In such embodiments, the method includes receiving at least one signal from at least one remote source; correlating at least one local signal with the at least one received signal to generate at least one correlation result, determining a motion of an antenna of the signal processing system, generating a plurality of phasors, where each phasor represents a hypothesis comprising a signal phase representing a direction of arrival estimate for the at least one received signal, compensating a phase of at least one of the local signal, the at least one received signal or the at least one correlation result based on the plurality of hypotheses regarding the determined motion and the direction of arrival to generate a plurality of phase-compensated correlation results, determining a hypothesis in the plurality of hypotheses that optimizes the at least one of the phase-compensated correlation results, identifying a direction of arrival for the at least one received signal using the determined hypothesis, and determining, from the direction of arrival of each at least one received signal, a response to be applied to the at least one received signal to improve co-channel operation.

In other embodiments of the present principles, a method is provided for improving co-channel operation between two radio systems. In such embodiments, a system includes a first radio system transceiver having an antenna and a transceiver controller that controls an antenna pattern for the antenna and the method includes receiving at least one signal from a remote source forming a portion of a second radio system, where the at least one signal is an undesired signal that interferes with the operation of the first radio system transceiver, correlating at least one local signal with the at least one received signal to generate at least one correlation result, determining a motion of the antenna of the first radio system transceiver; generating a plurality of phasors, where each phasor represents a hypothesis comprising a signal phase representing a direction of arrival estimate for the at least one received signal, compensating a phase of at least one of the local signal, the at least one received signal or the at least one correlation results based on the plurality of hypotheses regarding the determined motion and the direction of arrival to generate a plurality of phase-compensated correlation results, determining a hypothesis in the plurality of hypotheses that optimizes the at least one of the phase-compensated correlation results, identifying a direction of arrival for the at least one received signal using the determined hypothesis, and adjusting, using the transceiver controller, the antenna pattern to degrade signal reception of the undesired signal.

In other embodiments of the present principles, an apparatus is provided for performing signal correlation within a signal processing system. In such embodiments, the apparatus includes at least one processor and at least one memory for storing instructions that, when executed by the at least one processor, causes the apparatus to perform operations including receiving at least one signal from at least one remote source, correlating at least one local signal with the at least one received signal to generate at least one correlation result, determining a motion of an antenna of the signal processing system, generating a plurality of phasors, where each phasor represents a hypothesis comprising a signal phase representing a direction of arrival estimate for the at least one received signal, compensating a phase of at least one of the local signal, the at least one received signal or the at least one correlation results based on the plurality of hypotheses regarding the determined motion and the direction of arrival to generate a plurality of phase-compensated correlation results, determining a hypothesis in the plurality of hypotheses that optimizes the at least one of the phase-compensated correlation results, identifying a direction of arrival for the at least one received signal using the determined hypothesis, and determining, from the direction of arrival of each at least one received signal, a response to be applied to the at least one received signal to improve co-channel operation.

In other embodiments of the present principles, an apparatus is provided for improving co-channel operation of independent radio signals, which includes at least one processor and at least memory for storing programs and instructions. In such embodiments, when the programs and instructions in the memory are executed by the at least one processor, the apparatus performs operations including correlating at least one local signal with at least one radio frequency (RF) signal received at an antenna of a subject receiver from at least one independent source to generate at least one correlation result, determining a motion of the antenna of the subject receiver, generating a plurality of phasors, wherein each phasor represents a hypothesis comprising a signal phase related to a relative direction of motion of the received at least one RF signal with respect to the antenna, compensating a phase of at least one of the local signal, the received at least one RF signal or the at least one correlation result based on the generated plurality of phasors to determine at least one phase-compensated correlation result, identifying a phasor in the plurality of phasors that optimizes the at least one phase-compensated correlation result, determining a direction of arrival for the received at least one RF signal using the identified phasor that optimizes the at least one phase-compensated correlation result, and determining, from the determined direction of arrival for the received at least one RF signal, an action to take/perform to improve co-channel operation of the received at least one RF signal and the at least one local signal at the subject receiver.

In some embodiments of the present principles, the apparatus can comprise a transceiver controller in accordance with the present principles, such as the transceiver controller 118 of FIG. 1.

In some embodiments of the present principles, a system is provided for improving co-channel operation of independent radio signals, which includes a subject receiver including at least one antenna, a first source of local radio frequency (RF) signals, a second source of remote RF signals, and an apparatus which includes at least one processor and at least one memory for storing programs and instructions. In some embodiments, when the programs and instructions are executed by the at least one processor, the apparatus performs operations including correlating at least one local signal with at least one remote RF signal from the second source received at the antenna of the subject receiver to generate at least one correlation result, determining a motion of the antenna of the subject receiver, generating a plurality of phasors, where each phasor represents a hypothesis comprising a signal phase related to a relative direction of motion of the received at least one remote RF signal with respect to the antenna; compensating a phase of at least one of the at least one local signal, the received at least one remote RF signal or the at least one correlation result based on the generated plurality of phasors to determine at least one phase-compensated correlation result, identifying a phasor in the plurality of phasors that optimizes the at least one phase-compensated correlation result, determining a direction of arrival for at least one of the at least one local RF signal or the at least one remote RF signal using the identified phasor that optimizes the at least one phase-compensated correlation result, and determining, from the determined direction of arrival for the at least one local RF signal or the least one remote RF signal, an action to perform to improve co-channel operation of the at least one local RF signal and the at least one remote RF signal at the subject receiver.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with a computing device via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from the computing device can be transmitted to the computing device via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods and processes described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. Embodiments can also be implemented as instructions stored using one or more machine-readable media, which may be read and executed by one or more processors. A machine-readable medium can include any mechanism for storing or transmitting information in a form readable by a machine (e.g., a computing device or a "virtual machine" running on one or more computing devices). For example, a machine-readable medium can include any suitable form of volatile or non-volatile memory.

In addition, the various operations, processes, and methods disclosed herein can be embodied in a machine-readable medium and/or a machine accessible medium/storage device compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium/storage device.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

Any block, step, module, or otherwise described herein may represent one or more instructions which can be stored on non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g. A, AB, AC, ABC, ABB, etc.). When "and/or" is used, it should be understood that the elements may be joined in the alternative or conjunctive.

While the foregoing is directed to embodiments of the present principles, other and further embodiments of the present principles may be devised without departing from the basic scope thereof, and the scope thereof is determined by the claims that follow.

The invention claimed is:

1. A method for improving co-channel operation of independent radio signals, comprising:
receiving at least two co-channel radio frequency (RF) signals at an antenna of a subject receiver;
correlating at least one local signal with at least one of the received at least two co-channel RF signals to generate at least one respective correlation result;
determining a motion of the antenna of the subject receiver;
generating a plurality of phasors, where each phasor represents a hypothesis comprising a signal phase related to a relative direction of motion of the at least one of the received at least two co-channel RF signals with respect to the antenna;
compensating a phase of at least one of the local signal, the at least one of the received at least two co-channel RF signals or the at least one correlation result based on the generated plurality of phasors to determine at least one phase-compensated correlation result;
identifying a phasor in the plurality of phasors that optimizes the at least one phase-compensated correlation result;
determining a direction of arrival for the at least one of the received at least two co-channel RF signals using the identified phasor that optimizes the at least one phase-compensated correlation result; and
determining, from the determined direction of arrival for the at least one of the received at least two co-channel RF signals, an action to perform to improve co-channel operation of the received at least two co-channel RF signals at the subject receiver.

2. The method of claim 1, wherein the at least one of the received at least two co-channel RF signals comprises an RF signal from a first source desired to be received by the subject receiver and wherein the determined action to perform comprises at least one of adjusting an antenna pattern of the antenna of the subject receiver to increase a reception quality of the desired RF signal at the subject receiver, adjusting a time of reception of the antenna of the subject receiver to configure the antenna to receive signals during a time of transmission of the desired RF signal, or communicating a command to the first source to cause the first source to perform an action to increase a reception quality of the desired RF signal at the subject receiver;
wherein a location of the first source is determined using a determined DoA of the desired RF signal.

3. The method of claim 2, wherein adjusting an antenna pattern of the antenna of the subject receiver to increase a reception quality of the desired RF signal at the subject receiver comprises at least one of beam steering a main sensitivity lobe of an antenna pattern of the antenna toward a determined direction of arrival of the desired RF signal or the first source, or steering a null of the antenna pattern of the antenna away from the determined direction of arrival of the desired RF signal or the first source.

4. The method of claim 2, wherein communicating a command to the first source to cause the first source to perform an action to increase a reception quality of the desired RF signal at the subject receiver comprises at least one of communicating a command to the first source of the desired RF signal to adjust an antenna pattern of a transmission antenna of the first source to steer a transmission of the desired RF signal from the first source toward the antenna of the subject receiver, or communicating a command to the first source of the desired RF signal to steer a null of the antenna pattern of the transmission antenna of the first source away from the direction of the antenna of the subject receiver.

5. The method of claim 1, wherein the at least one of the at least two co-channel RF signals comprises an RF signal from a second source local to the subject receiver but not desired to be received by the subject receiver and wherein the determined action to perform comprises at least one of adjusting an antenna pattern of the antenna of the subject receiver to decrease a reception quality of the undesired RF signal at the subject receiver, adjusting a time of reception of the antenna of the subject receiver to prevent the antenna from receiving signals during a time of transmission of the undesired RF signal, or communicating a command to the second source to cause the second source to perform an action to decrease a reception quality of the undesired RF signal at the subject receiver;
wherein a location of the second source is determined using a determined DoA of the undesired RF signal.

6. The method of claim 5, wherein adjusting an antenna pattern of the antenna of the subject receiver comprises at least one of beam steering a main sensitivity lobe of the antenna pattern of the antenna away from a determined direction of arrival of the undesired RF signal or the second source, or steering a null of the antenna pattern of the antenna in the determined direction of arrival of at least one of the undesired RF signal or the second source.

7. The method of claim 5, wherein communicating a command to the second source to cause the second source to perform an action to decrease a reception quality of undesired RF signal at the subject receiver comprises at least one of communicating a command to the second source of the undesired RF signal to adjust an antenna pattern of a transmission antenna of the second source to steer a transmission of the undesired RF signal away from the antenna of the subject receiver, or communicating a command to the second source of the undesired RF signal to steer a null of the antenna pattern of the transmission antenna of the second source in the direction of the antenna of the subject receiver.

8. The method of claim 1, wherein the received at least two co-channel RF signals comprise at least one altimeter signal from a first source and at least one 5G signal from a second source and the subject receiver is configured to receive the at least one altimeter signal from the first source.

9. An apparatus for improving co-channel operation of independent radio signals, comprising:
at least one processor and at least one memory for storing programs and instructions that, when executed by the at least one processor, causes the apparatus to perform operations comprising:
correlating at least one local signal with at least one of at least two co-channel radio frequency (RF) signals received at an antenna of a subject receiver to generate at least one correlation result;
determining a motion of the antenna of the subject receiver;
generating a plurality of phasors, where each phasor represents a hypothesis comprising a signal phase related to a relative direction of motion of the at least one of the received at least two co-channel RF signals with respect to the antenna;
compensating a phase of at least one of the local signal, the at least one of the received at least two co-channel RF signals or the at least one correlation result based on the generated plurality of phasors to determine at least one phase-compensated correlation result;

identifying a phasor in the plurality of phasors that optimizes the at least one phase-compensated correlation result;

determining a direction of arrival for the at least one of the received at least two co-channel RF signals using the identified phasor that optimizes the at least one phase-compensated correlation result; and determining, from the determined direction of arrival for the at least one of the received at least two co-channel RF signals, an action to perform to improve co-channel operation of the received at least two co-channel RF signals at the subject receiver.

10. The apparatus of claim 9, wherein the at least one of the received at least two co-channel RF signals comprises an RF signal from a first source desired to be received by the subject receiver and wherein the determined action to perform comprises at least one of adjusting an antenna pattern of the antenna of the subject receiver to increase a reception quality of the desired RF signal at the subject receiver, adjusting a time of reception of the antenna of the subject receiver to configure the antenna to receive signals during a time of transmission of the desired RF signal, or communicating a command to the first source to cause the first source to perform an action to increase a reception quality of the desired RF signal at the subject receiver;

wherein a location of the first source is determined using a determined DoA of the desired RF signal.

11. The apparatus of claim 10, wherein adjusting an antenna pattern of the antenna of the subject receiver to increase a reception quality of the desired RF signal at the subject receiver comprises at least one of beam steering a main sensitivity lobe of an antenna pattern of the antenna toward a determined direction of arrival of the desired RF signal or the first source, or steering a null of the antenna pattern of the antenna away from the determined direction of arrival of the desired RF signal or the first source.

12. The apparatus of claim 10, wherein communicating a command to the first source to cause the first source to perform an action to increase a reception quality of the desired RF signal at the subject receiver comprises at least one of communicating a command to the first source of the desired RF signal to adjust an antenna pattern of a transmission antenna of the first source to steer a transmission of the desired RF signal from the first source toward the antenna of the subject receiver, or communicating a command to the first source of the desired RF signal to steer a null of the antenna pattern of the transmission antenna of the first source away from the direction of the antenna of the subject receiver.

13. The apparatus of claim 9, wherein the at least one of the at least two co-channel RF signals comprises an RF signal from a second source local to the subject receiver but not desired to be received by the subject receiver and wherein the determined action to perform comprises at least one of adjusting an antenna pattern of the antenna of the subject receiver to decrease a reception quality of the undesired RF signal at the subject receiver, adjusting a time of reception of the antenna of the subject receiver to prevent the antenna from receiving signals during a time of transmission of the undesired RF signal, or communicating a command to the second source to cause the second source to perform an action to decrease a reception quality of the undesired RF signal at the subject receiver;

wherein a location of the second source is determined using a determined DoA of the undesired RF signal.

14. The apparatus of claim 13, wherein adjusting an antenna pattern of the antenna of the subject receiver comprises at least one of beam steering a main sensitivity lobe of the antenna pattern of the antenna away from a determined direction of arrival of the undesired RF signal or the second source, or steering a null of the antenna pattern of the antenna in the determined direction of arrival of at least one of the undesired RF signal or the second source.

15. The apparatus of claim 13, wherein communicating a command to the second source to cause the second source to perform an action to decrease a reception quality of undesired RF signal at the subject receiver comprises at least one of communicating a command to the second source of the undesired RF signal to adjust an antenna pattern of a transmission antenna of the second source to steer a transmission of the undesired RF signal away from the antenna of the subject receiver, or communicating a command to the second source of the undesired RF signal to steer a null of the antenna pattern of the transmission antenna of the second source in the direction of the antenna of the subject receiver.

16. The apparatus of claim 9, wherein the received at least two co-channel RF signals comprise at least one altimeter signal from a first source and at least one 5G signal from a second source and the subject receiver is configured to receive the at least one altimeter signal from the first source.

17. A system for improving co-channel operation of independent radio signals, comprising:

a subject receiver comprising at least one antenna;

a first source of at least one first radio frequency (RF) signal;

a local, second source of at least one second RF signal; and an apparatus comprising at least one processor and at least one memory for storing programs and instructions that, when executed by the at least one processor, causes the apparatus to perform operations comprising:

correlating at least one local signal with at least one of at least one first RF signal from the first source or at least one second RF signal from the second source received at the antenna of the subject receiver to generate at least one correlation result;

determining a motion of the antenna of the subject receiver;

generating a plurality of phasors, where each phasor represents a hypothesis comprising a signal phase related to a relative direction of motion of the at least one of the at least one first RF signal or the at least one second RF signal with respect to the antenna;

compensating a phase of at least one of the at least one local signal, the at least one of the at least one first RF signal or the at least one second RF signal or the at least one correlation result based on the generated plurality of phasors to determine at least one phase-compensated correlation result;

identifying a phasor in the plurality of phasors that optimizes the at least one phase-compensated correlation result;

determining a direction of arrival for the at least one of the at least one first RF signal or the at least one second RF signal using the identified phasor that optimizes the at least one phase-compensated correlation result; and determining, from the determined direction of arrival for the at least one of the at least one first RF signal or the least one second RF signal, an action to perform to improve co-channel operation of the at least one first RF signal and the at least one second RF signal at the subject receiver.

18. The system of claim 17, wherein the action to perform includes at least one of altering a pattern of transmission of respective antennas of at least one of the first source of the at least one first RF signal or the second source of the at least one second RF signal or altering a pattern of sensitivity of a respective antenna of the subject receiver, based on the direction of arrival determined for the at least one of the at least one first RF signal or the at least one second RF signal to improve co-channel operation of the at least one first RF signal and the at least one second RF signal at the subject receiver.

19. The system of claim 18, wherein the first source comprises a transmitter of altimeter signals and the second source comprises a local transceiver of 5G signals and the subject receiver is configured to receive the altimeter signals from the transmitter of the altimeter signals.

20. The system of claim 19, wherein the transmitter of the altimeter signals comprises a portion of a first radio system and the local transceiver of the 5G signals comprises a portion of a second radio system.

\* \* \* \* \*

UNITED STATES PATENT AND TRADEMARK OFFICE
CERTIFICATE OF CORRECTION

| | | |
|---|---|---|
| PATENT NO. | : 12,438,594 B2 | Page 1 of 1 |
| APPLICATION NO. | : 18/198591 | |
| DATED | : October 7, 2025 | |
| INVENTOR(S) | : Ramsey Michael Faragher et al. | |

It is certified that error appears in the above-identified patent and that said Letters Patent is hereby corrected as shown below:

On the Title Page

Item (74) in attorney, agent or firm, delete "MOSER TABOA" and insert -- Moser Taboada --

Signed and Sealed this
Tenth Day of February, 2026

John A. Squires
*Director of the United States Patent and Trademark Office*